(12) United States Patent
Harding et al.

(10) Patent No.: US 10,609,939 B2
(45) Date of Patent: Apr. 7, 2020

(54) COCONUT WATER REMOVAL DEVICE AND METHOD THEREFOR

(71) Applicants: Lou Harding, Chatsworth, CA (US); Vincent Zaldivar, Las Vegas, NV (US); Brian Redlus, La Crescenta, CA (US)

(72) Inventors: Lou Harding, Chatsworth, CA (US); Vincent Zaldivar, Las Vegas, NV (US); Brian Redlus, La Crescenta, CA (US)

(73) Assignee: MONARCH MEDIA, LLC, Las Vegas, NV (US)

( * ) Notice: Subject to any disclaimer, the term of this patent is extended or adjusted under 35 U.S.C. 154(b) by 177 days.

(21) Appl. No.: 14/557,783

(22) Filed: Dec. 2, 2014

(65) Prior Publication Data

US 2015/0164130 A1 Jun. 18, 2015

Related U.S. Application Data

(60) Provisional application No. 61/916,361, filed on Dec. 16, 2013.

(51) Int. Cl.
| | | |
|---|---|---|
| *A23N 1/02* | (2006.01) | |
| *A23L 2/04* | (2006.01) | |
| *A47J 43/26* | (2006.01) | |
| *A47J 19/02* | (2006.01) | |

(52) U.S. Cl.
CPC ............ *A23L 2/04* (2013.01); *A47J 19/02* (2013.01); *A47J 43/26* (2013.01)

(58) Field of Classification Search
CPC ..... A23N 1/02; A23N 5/03; A23L 2/04; A47J 19/022

USPC ..... 222/80, 81, 82, 83, 83.5, 85, 86, 87, 88, 222/89, 90, 91; 99/506; 219/394; 248/58

See application file for complete search history.

(56) References Cited

U.S. PATENT DOCUMENTS

| | | | | | |
|---|---|---|---|---|---|
| 3,372,839 | A | * | 3/1968 | Hayes | B65D 83/70 222/136 |
| 3,768,698 | A | * | 10/1973 | Corty, Sr. | B67B 7/26 222/91 |
| 4,271,982 | A | * | 6/1981 | Niksich | B65D 47/248 222/501 |
| 5,005,336 | A | * | 4/1991 | Bloom | B65D 13/00 206/457 |
| 5,119,559 | A | * | 6/1992 | Sanabria | A47J 25/00 30/120.1 |
| 5,482,176 | A | * | 1/1996 | Maietta | B65D 77/067 215/220 |
| 6,971,548 | B2 | * | 12/2005 | Smith | B67D 3/0019 222/83 |
| 7,196,291 | B2 | * | 3/2007 | Cothran | F24C 7/06 219/393 |
| 7,980,424 | B2 | * | 7/2011 | Johnson | B65D 75/5877 222/105 |

(Continued)

*Primary Examiner* — Jimmy Chou
(74) *Attorney, Agent, or Firm* — Weiss & Moy, P.C.; Jeffrey D. Moy

(57) ABSTRACT

A device from draining coconut water from a coconut has a handle. A tubular member extends down from the handle. A plurality of teeth extends down from a distal end of the tubular member. An end cap member is positioned over the distal end of the tubular member.

5 Claims, 5 Drawing Sheets

(56) References Cited

U.S. PATENT DOCUMENTS

| | | | | |
|---|---|---|---|---|
| 8,622,853 | B1* | 1/2014 | Roland | A63B 69/3623 473/257 |
| 8,627,975 | B1* | 1/2014 | Whitbeck | B65D 35/32 220/254.1 |
| D729,592 | S* | 5/2015 | Alavian | D7/665 |
| 9,049,885 | B2* | 6/2015 | dePoo | B26D 3/26 |
| 10,278,415 | B2* | 5/2019 | dePoo | B26D 3/26 |
| 2005/0011909 | A1* | 1/2005 | Hanell | B67B 7/26 222/83 |
| 2005/0236425 | A1* | 10/2005 | Casale | B65D 5/748 222/83.5 |
| 2005/0242113 | A1* | 11/2005 | Weist | B65D 5/748 222/83.5 |
| 2009/0020558 | A1* | 1/2009 | Bolli | B65D 5/748 222/83 |
| 2009/0250488 | A1* | 10/2009 | Dubach | B65D 5/748 222/83 |
| 2009/0291172 | A1* | 11/2009 | Saez | A23L 2/56 426/330.5 |
| 2009/0302037 | A1* | 12/2009 | Rigling | B65D 5/748 220/258.4 |
| 2010/0018992 | A1* | 1/2010 | Dill | B65D 5/747 222/83 |
| 2010/0038494 | A1* | 2/2010 | Osborn | F16L 3/1218 248/58 |
| 2010/0075782 | A1* | 3/2010 | Stiles | A63B 57/203 473/386 |
| 2010/0264146 | A1* | 10/2010 | Casale | B65D 5/029 220/278 |
| 2011/0036249 | A1* | 2/2011 | Barrett | A47J 25/00 99/544 |
| 2011/0147414 | A1* | 6/2011 | Chen | B65D 51/285 222/83 |
| 2012/0138634 | A1* | 6/2012 | Benko | B65D 5/748 222/83 |
| 2012/0272831 | A1* | 11/2012 | Barberio | B01F 3/0446 99/323.1 |
| 2013/0168412 | A1* | 7/2013 | Barron | B65D 51/221 222/83 |
| 2013/0233885 | A1* | 9/2013 | Cohen | B67B 7/26 222/91 |
| 2014/0048557 | A1* | 2/2014 | Barron | B65D 5/748 222/81 |
| 2014/0144937 | A1* | 5/2014 | Arsena-Armstrong | B67B 7/26 222/89 |
| 2014/0197199 | A1* | 7/2014 | Barron | B65D 51/243 222/83 |
| 2015/0048110 | A1* | 2/2015 | dePoo | A23L 2/04 222/567 |
| 2015/0068406 | A1* | 3/2015 | Marsden | C12G 1/00 99/323.1 |
| 2017/0209003 | A1* | 7/2017 | Quintero | A47J 43/26 |

* cited by examiner

COCONUT WATER REMOVAL DEVICE AND METHOD THEREFOR

RELATED APPLICATIONS

This patent application further claims the benefit of U.S. Provisional Application No. 61/916,361, filed Dec. 16, 2013, entitled "COCONUT WATER REMOVAL DEVICE AND METHOD THEREFOR" in the name of the same inventors, and which is incorporated herein by reference in its entirety.

TECHNICAL FIELD

This disclosure relates generally to a fruit opening system, and more particularly to a system and method to open a coconut to access and drink the coconut water stored within the coconut.

BACKGROUND

Coconut water is a liquid that forms naturally inside the shell of a coconut. It is a common drink in many tropical countries and is becoming more popular in the United States as many companies are marketing it as a natural sports drink. Coconut water has fewer calories, less sodium, and more potassium than most sports drink. Ounce per ounce, most unflavored coconut water contains 5.45 calories, 1.3 grams sugar, 61 milligrams (mg) of potassium, and 5.45 mg of sodium compared to Gatorade®, which has 6.25 calories, 1.75 grams of sugar, 3.75 mg of potassium, and 13.75 mg of sodium.

Coconut water should not be confused with high-fat coconut milk or oil. Coconut water is a clear liquid in the fruit's center that is tapped from young, green coconuts.

Presently, there is no easy way to remove the coconut water from within the coconut. In general, most people try to find the soft "eye" of the coconut. The soft "eye" is a black spot located at the top of the coconut. Once the soft "eye" of the coconut is located, a person may use a metallic skewer such as a screwdriver to pierce the coconut. Alternatively, a nail and a hammer may be used to create the opening in the soft "eye".

Once the soft "eye" has been pierced, the skewer may be pushed towards the interior of the coconut. The skewer may then be removed and the coconut water may be drained into a bowl or other container.

Unfortunately, the above method is not easy. Further, it does not allow one to easily drain the coconut water. Many times after removing the skewer and trying to drain the coconut water, the coconut water tends to hug the side of the coconut and spill never reaching the bowl.

Therefore, it would be desirable to provide a system and method that overcomes the above.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a device from draining coconut water from a coconut is disclosed. The device has a handle. A tubular member extends down from the handle. A plurality of teeth extends down from a distal end of the tubular member. An end cap member is positioned over the distal end of the tubular member.

In accordance with one aspect of the present application, a device from draining coconut water from a coconut is disclosed. The device has a handle. A tubular member extends down from the handle. A window is formed within the tubular member exposing an interior of the tubular member. A plurality of teeth extends down from a distal end of the tubular member. An end cap member is positioned over the distal end of the tubular member.

In accordance with one aspect of the present application, a device from draining coconut water from a coconut is disclosed. The device has a base member having a plurality of flat surfaces formed around an outer perimeter. A tubular member extends downward from a central area of the base member, a distal end of the tubular member cut at an angle to form a pointed edge. A spout extends up from a top section of the base member and in fluid communication with the tubular member.

BRIEF DESCRIPTION OF THE DRAWINGS

Embodiments of the disclosure will become more fully understood from the detailed description and the accompanying drawings, wherein.

DESCRIPTION OF THE DISCLOSURE

Figure 1:
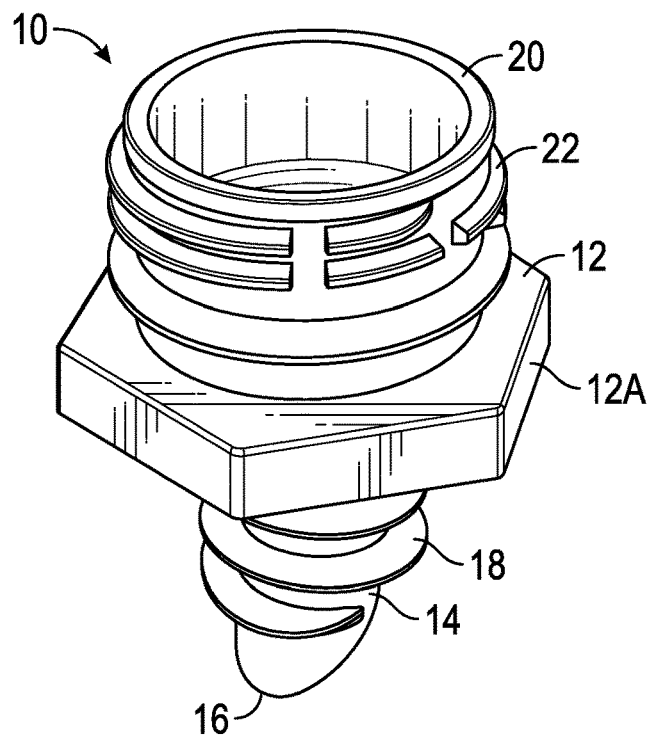
FIG. 1 is a perspective view of the coconut water removal device.
Figure 2:
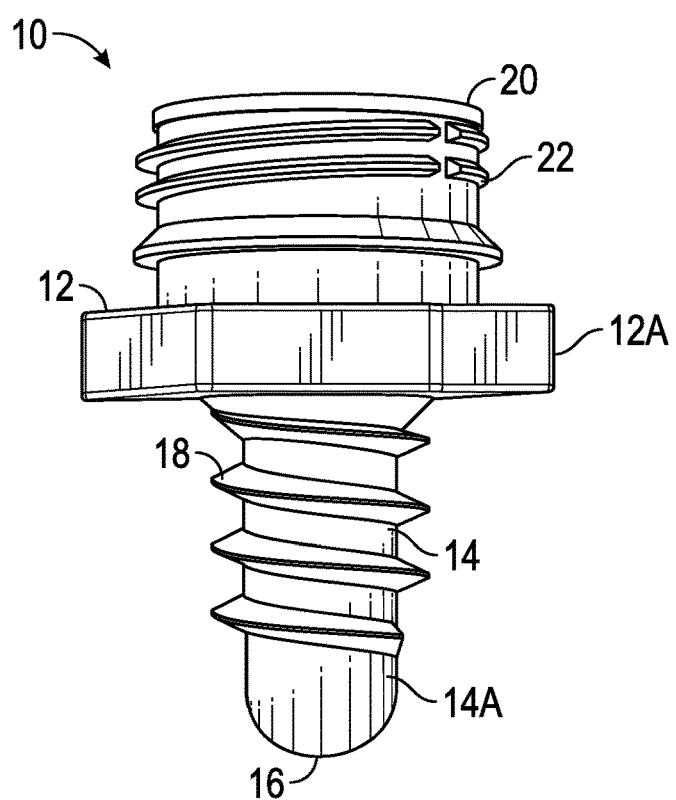
FIG. 2 is a front view of the coconut water removal device.
Figure 3:
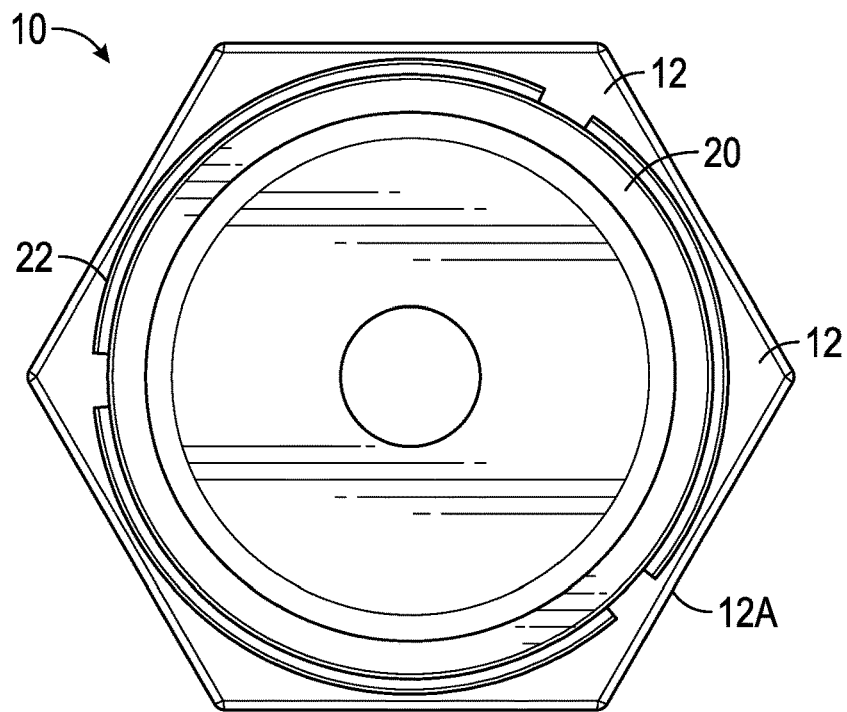
FIG. 3 is a top view of the coconut water removal device.
Figure 4:
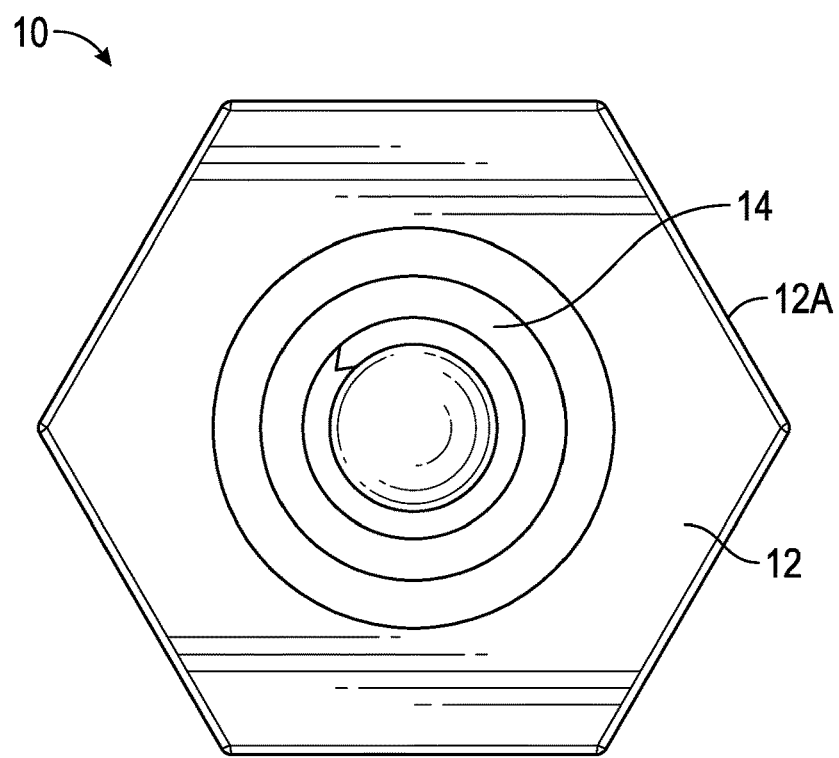
FIG. 4 is a bottom view of the coconut water removal device
Figure 5:
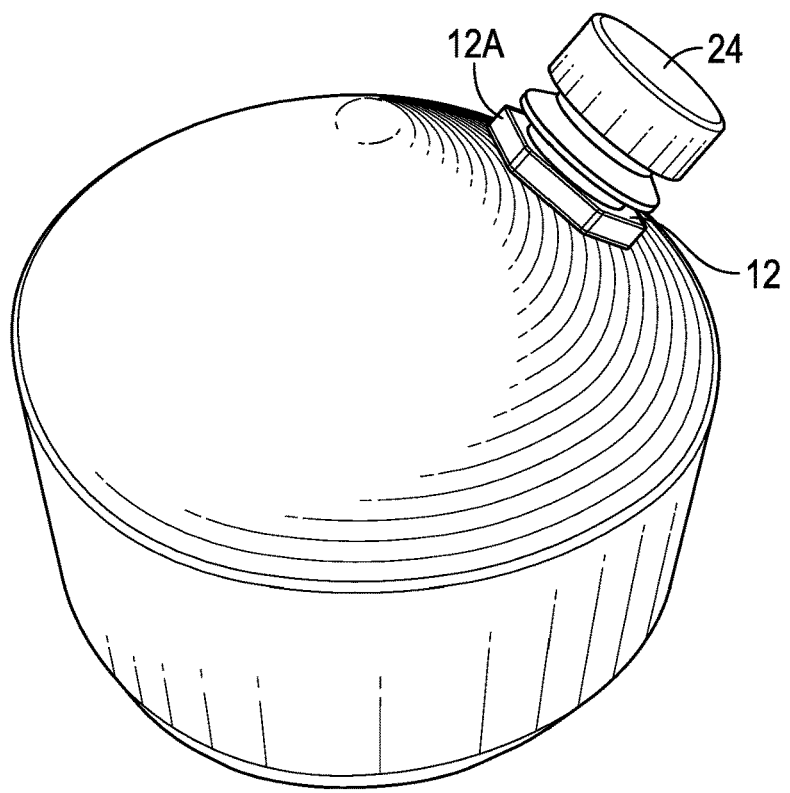
FIG. 5 is a side perspective view of the coconut water removal device with the lid on inserted into a coconut.
Figure 6:
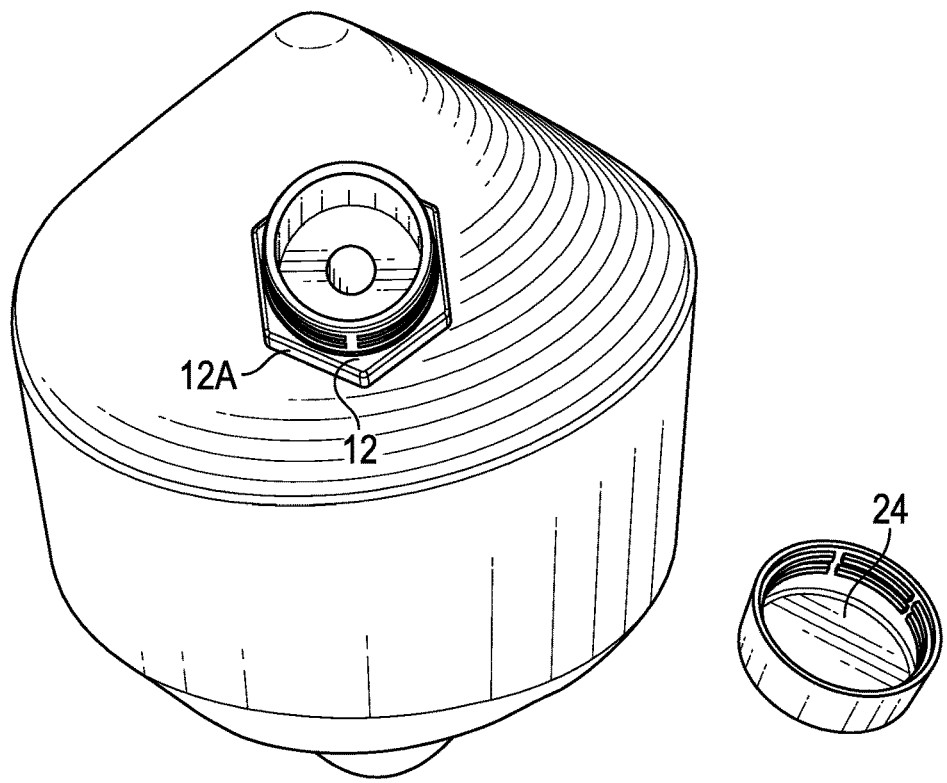
FIG. 6 is a front perspective view of the coconut water removal device with the lid off inserted into a coconut.

Referring to the FIGS. 1-6, one embodiment of a coconut water removal device 10 (hereinafter device 10) is shown. The device 10 may be inserted into a coconut 26 to drain the coconut water formed inside the coconut 26. The device 10 may be used to convert the coconut 26 into a drinking device with a resealable top that can be opened and closed at will.

The device 10 may have a base member 12. The base member 12 may have a plurality of flat surfaces 12A formed around an outer perimeter of the base member 12. The number of flat surfaces 12A may vary. The flat surfaces 12A may be arranged so that the base member 12 can be configured as a hardware nut.

A tubular member 14 may extend downward from a central area of the base member 12. A distal end 14A of the tubular member 14 may be cut at an angle to form a pointed edge 16. The pointed edge 16 may be configured to allow the device 10 to cut through the outer shell of the coconut and be inserted into the interior of the coconut. The tubular member 14 may have threading 18 formed around an exterior surface thereof. The threading 18 is a helical structure used to convert between rotational and linear movement or force.

A spout 20 may extend up from a top section of the base member 12. The spout 20 may be in fluid communication with the tubular member 14. Thus, a pathway may be formed from the spout 20, through the base member 12 and through the tubular member 14. Thus, the spout 20 may be used to pour out the coconut water from the interior of the coconut once the device 10 is inserted into the coconut. Ribbing 22 may be formed around an outer surface of the spout 20. The ribbing 22 may be used to secure a lid 24 or closure device to the spout 20.

In use, a user of the device 10 may push the pointed edge 16 of the device 10 into the soft "eye" of the coconut. While it is easier to insert the device 10 into the "eye", it may be inserted into other areas of the coconut. A user may then use a wrench or similar tool to rotate the base member 12 thereby causing the threading 18 of the tubular member 14 to rotate into the coconut. The threading 18 can secure the device 10 to the coconut and further prevents leakage of the coconut water from the soft "eye" of the coconut where the device 10 was inserted. Once the device 10 is inserted and tightened, the user may pour the coconut water out via the spout 20 or use the device 10 to drink the coconut water directly from the coconut. The user may place the lid 24 on the device 10 and reseal the coconut if all the coconut water is not drunk.

Figure 7:
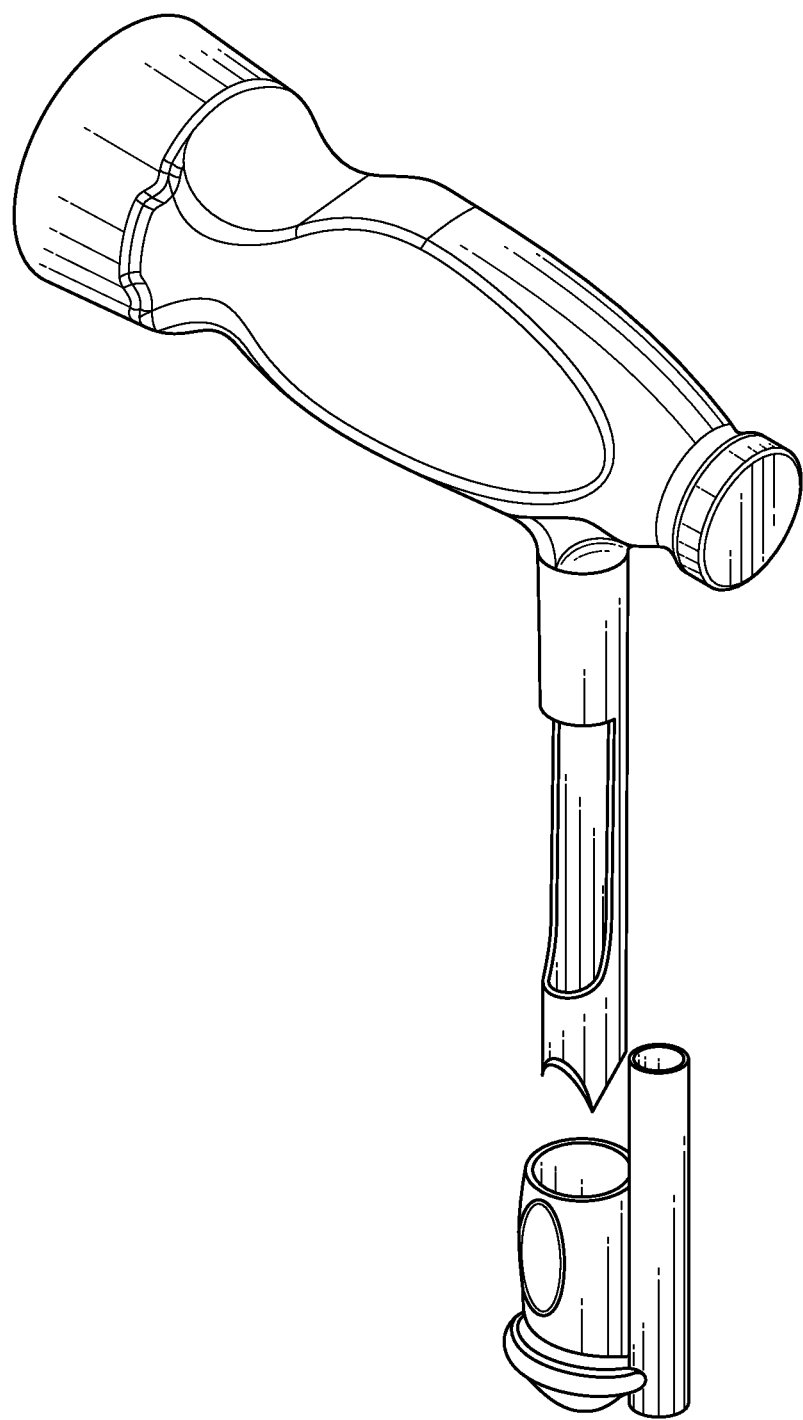
FIG. 7 is a perspective view of another embodiment of the coconut water removal device.
Figure 11:
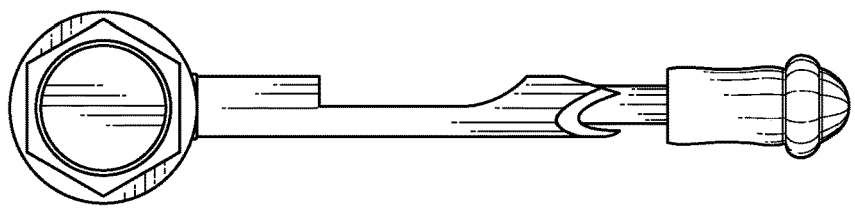
FIG. 11 is a front side view of the coconut water removal device of FIG. 7.
Figure 10:
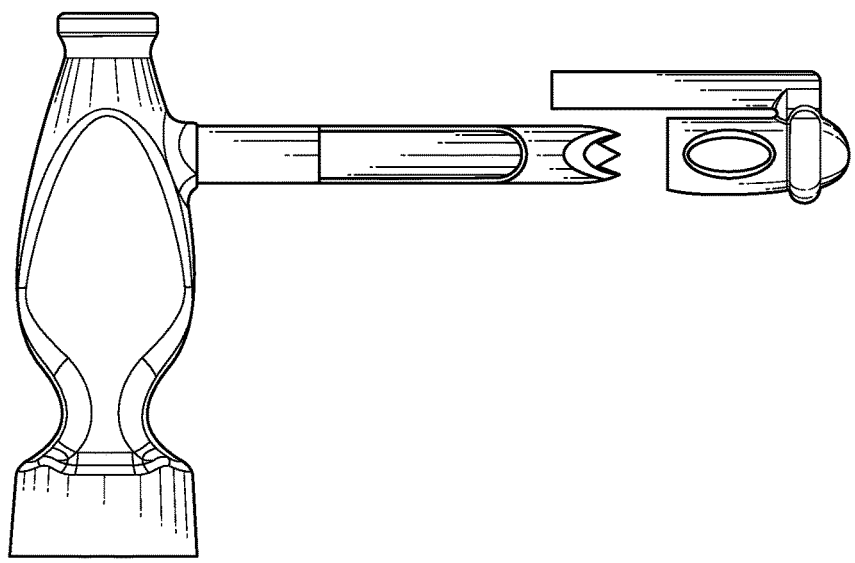
FIG. 10 is a second side view of the coconut water removal device of FIG. 7.
Figure 9:
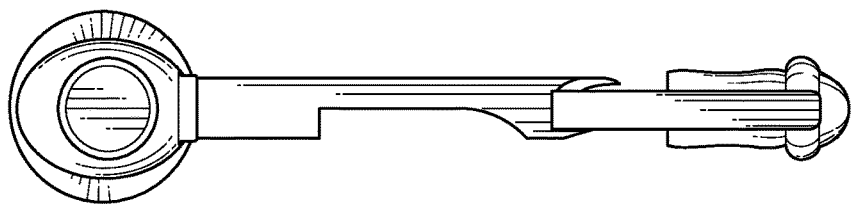
FIG. 9 is a back side view of the coconut water removal device of FIG. 7.
Figure 8:
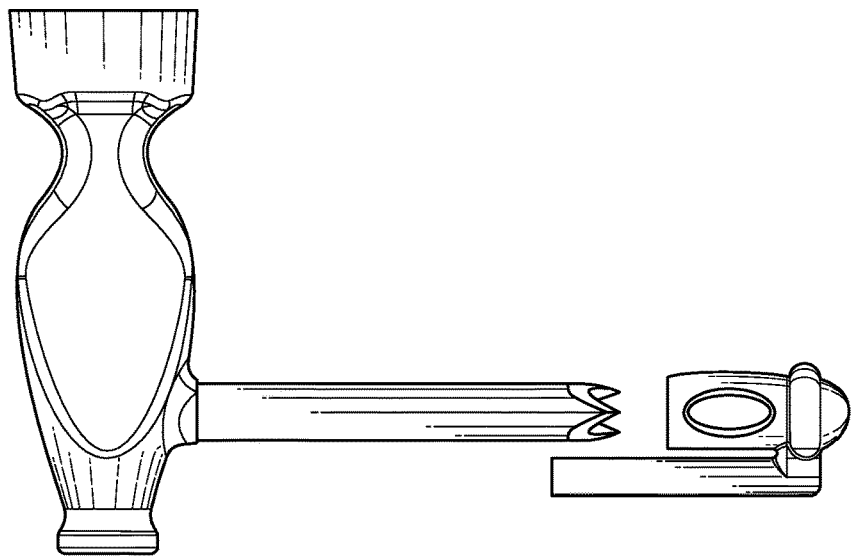
FIG. 8 is a first side view of the coconut water removal device of FIG. 7.

Referring to FIGS. 7-11, another embodiment of a coconut water removal device 10' (hereinafter device 10') is shown. The device 10' has a handle member 30. The handle 30 may be used to grip the device 10'. In accordance with the embodiment shown in FIGS. 7-11, the handle 30 may have a curved section 30A. An indented area 30B may extend from the curved section 30A. The handle 30 may be configured to allows one to more comfortable grab the handle 30 when using the device 10'.

The device may have a tubular member 42. A first end 42A of the tubular member 42 may extend down from a bottom section 40C of the handle 30. A second end 42B of the tubular member 42 may have a jagged configuration. The second end 42B may have a plurality of teeth 44 extending down from the second end 42B. The teeth 44 may be sharp to allow the tubular member 42 to cut and penetrate into a coconut as described below.

The tubular member 42 may have an opening 46 formed therein to expose an interior of the tubular member 42. The opening 46 may have a rounded/curved bottom section. The opening 46 may be used to remove any debris and/or items that may be stuck in the interior of the tubular member.

The device 10' may have an end cap 48. The end cap 48 may be positioned over the second end 42B of the tubular member 42 when the device 10' is not in use. The end cap 48 may be used to protect others from being hurt and/or cut by the second end 42B of the tubular member 42.

In the embodiment shown, the end cap 48 may have a tubular cap member 50. The tubular cap member 50 may be configured to fit snugly over the second end 42B of the tubular member 42. A rod member 52 may be attached to the tubular cap member 50. The rod member 52 may be dimensioned to fit within the tubular member 42.

In operation, the user may grip the device 10' be grabbing the handle 30. The user may grip the handle 30 with a palm of the user's hand pressing against a top section of the handle 30 and the user's fingers wrapped around a bottom section of the handle 30. The user may press the second end 42B of the tubular member 42 into the soft "eye" of the coconut. The device 10' may be inserted into other areas of the coconut without departing from the spirit and scope of the present application.

When the device 10' has reached the interior of the coconut, the user may remove the device 10 from the coconut. A pathway may be formed within the coconut to allow the user to drain the coconut water from the coconut.

When the user removes the device 10', remnants of the coconut may be left within the tubular member 42. The user may insert the rod member 52 into the tubular member 42. Remnants of the coconut left within the tubular member 42 may be pushed out the opening 46 formed in the tubular member 42.

While embodiments of the disclosure have been described in terms of various specific embodiments, those skilled in the art will recognize that the embodiments of the disclosure may be practiced with modifications within the spirit and scope of the claims.

What is claimed is:

1. A device for draining coconut water from a coconut comprising:

a base member having a plurality of flat surfaces formed around an outer perimeter in a screw nut configuration, wherein each of the plurality of flat surfaces formed around the outer perimeter are planer to one another and adjoining flat surfaces of the plurality of flat surfaces form approximately equal angles around an outer perimeter to form the screw nut configuration, the screw nut configuration allowing a rotation force to be applied to the base member securing the device within the coconut;

a tubular member attached to and extending downward from a central area of the base member;

threading formed around an exterior surface of the tubular member, wherein the rotational force causing the threading to rotate in a coconut securing the device into the coconut and preventing leakage of contents within the coconut from leaking out of an area on the coconut where the device was inserted; and a spout extending up from a top section of the base member and in fluid communication with the tubular member;

wherein the tubular member is cut at a single angle below the threading the tubular member tapering to define a single bottom point at a distal end of the tubular member.

2. The device of claim 1, comprising ribbing formed around an outer surface of the spout.

3. The device of claim 1, comprising lid positioned over the spout.

4. The device of claim 2, comprising a lid positioned over the spout and engaging the ribbing.

5. The device of claim 1, wherein the plurality of flat surfaces are formed in a hex nut configuration around the outer perimeter.

* * * * *